United States Patent
Soloveichik

(10) Patent No.: US 7,879,750 B2
(45) Date of Patent: Feb. 1, 2011

(54) ANODES FOR ALKALINE ELECTROLYSIS

(75) Inventor: Grigorii Lev Soloveichik, Latham, NY (US)

(73) Assignee: General Electric Company, Niskayuna, NY (US)

( * ) Notice: Subject to any disclaimer, the term of this patent is extended or adjusted under 35 U.S.C. 154(b) by 943 days.

(21) Appl. No.: 11/564,956

(22) Filed: Nov. 30, 2006

(65) Prior Publication Data

US 2008/0128275 A1    Jun. 5, 2008

(51) Int. Cl.
*H01M 4/04* (2006.01)
*H01M 4/02* (2006.01)
*H01M 4/48* (2006.01)
*H01M 4/50* (2006.01)
*H01M 4/52* (2006.01)

(52) U.S. Cl. .................. 502/101; 204/291; 204/292; 204/294

(58) Field of Classification Search .................. 204/291, 204/292, 294; 502/101
See application file for complete search history.

(56) References Cited

U.S. PATENT DOCUMENTS

| 3,926,671 | A | * | 12/1975 | Gutjahr et al. | ............. 29/623.5 |
| 4,358,475 | A | | 11/1982 | Brown et al. | |
| 4,384,928 | A | | 5/1983 | Hall | |
| 4,462,875 | A | | 7/1984 | Stutts | |
| 4,464,239 | A | | 8/1984 | Tseung et al. | |
| 4,537,674 | A | | 8/1985 | Ovshinsky et al. | |
| 4,882,024 | A | | 11/1989 | Corrigan | |
| 2006/0024583 | A1 | * | 2/2006 | Singh et al. | ................. 429/245 |

OTHER PUBLICATIONS

Kim Kinoshita; "Electrochemcial Uses of Carbon" Electrochemistry Encyclopedia; Downloaded from http://electrochem.cwru.edu/ed/encycl/art-c01-carbon.htm, pp. 1-10.

* cited by examiner

*Primary Examiner*—Bruce F Bell
(74) *Attorney, Agent, or Firm*—Patrick K. Patnode

(57) ABSTRACT

A method of making an anode for alkaline electrolysis cells includes adsorption of precursor material on a carbonaceous material, conversion of the precursor material to hydroxide form and conversion of precursor material from hydroxide form to oxy-hydroxide form within the alkaline electrolysis cell.

Figure 1:
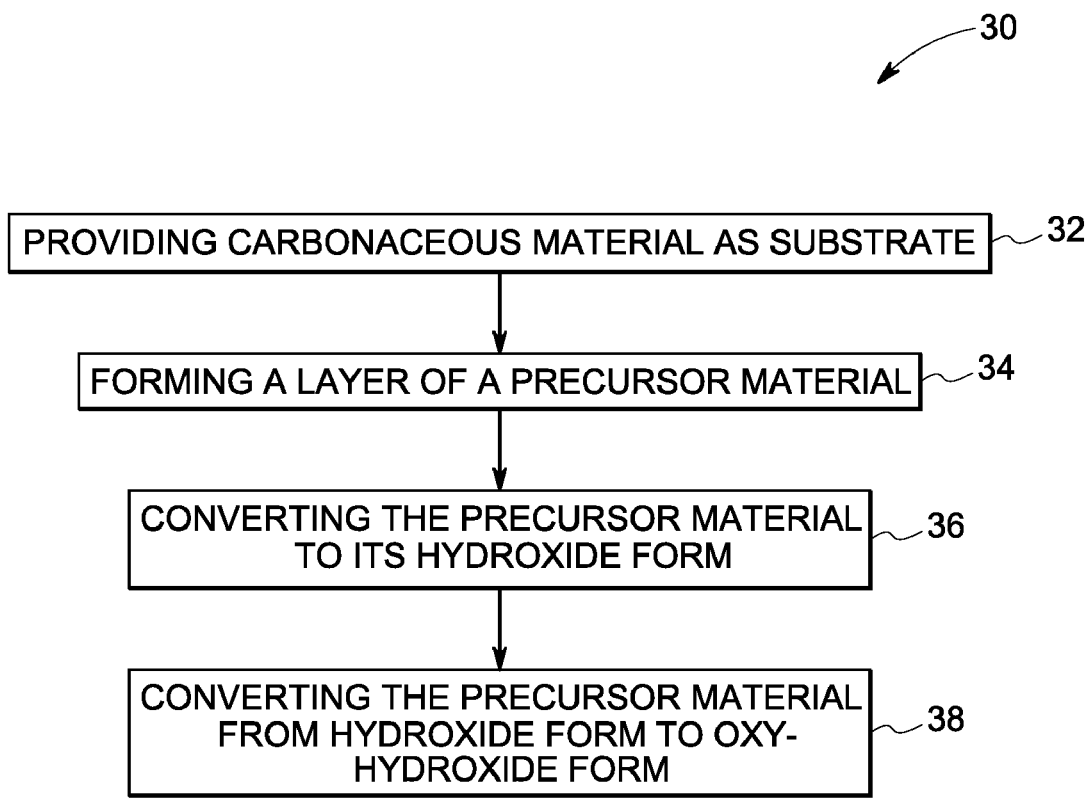

13 Claims, 2 Drawing Sheets

ANODES FOR ALKALINE ELECTROLYSIS

This invention was made with Government support under contract number DE-FC36-04GO14223 awarded by the Department of Energy. The Government has certain rights in the invention.

BACKGROUND

This invention generally relates to anodes for alkaline electrolysis and more specifically to methods of making a catalytic anode for alkaline electrolysis.

Electrolysis of alkaline solutions for production of hydrogen is receiving increased attention with society moving towards a hydrogen economy. This technology is known and has been studied for a long time and is suited for large-scale unattended operation. However, there are known issues with the process. The effectiveness of the method reduces over time due to development of overpotentials at the cathode and the anode. Overpotential at the anode—the oxygen electrode—constitutes a significant part of the total cell overvoltage and in turn represents a major energy requirement of electrolysis.

There have been multiple attempts to reduce anodic overvoltage. Initial attempts deployed noble metal electrodes like platinum. Although, platinum provides good catalytic activity, the cost becomes prohibitive for large-scale units. Another choice of material is nickel as a base material for the anode because of its stability in the alkaline environment. Typically a porous electrode is employed because it affords higher surface area for oxygen evolution. Initially the nickel electrodes are plated with platinum group metals. This combination results in lower loading of platinum, leading to reduction in cost while retaining the catalytic activity. But still the cost for industrial sized equipment is too high. The next generation of anodes incorporates various non-noble metal coatings onto the electrode. This includes nickel oxide and spinel oxides, for example, that acted as electrocatalysts and reduce the electrode overpotential levels. These oxides are typically deposited by techniques like electrodeposition (plating), slurry deposition, or spraying techniques like vacuum spraying or arc spraying. All these methods need special surface preparation and elaborate manufacturing process steps, resulting in higher costs of making electrodes and the electrolyzer assembly.

It is therefore desirable to devise a simple, cost effective method to produce oxygen electrodes (anodes) for alkaline water electrolysis.

BRIEF DESCRIPTION

Briefly, the embodiments of this invention provide for a method of making an anode for alkaline electrolysis cell that includes formation of a layer of a precursor material on a carbonaceous material, and conversion of precursor material to hydroxide form.

In some embodiments, a method of making an anode for alkaline electrolysis cells includes adsorption of precursor material on a carbonaceous material, conversion of the precursor material to hydroxide form and conversion of precursor material from hydroxide form to oxy-hydroxide form within the alkaline electrolysis cell.

In some embodiments, a catalytic anode for alkaline electrolysis cell is described which is prepared by forming a layer of a precursor material on a carbonaceous material; and converting the precursor material to a hydroxide form.

DRAWINGS

Figure 2:
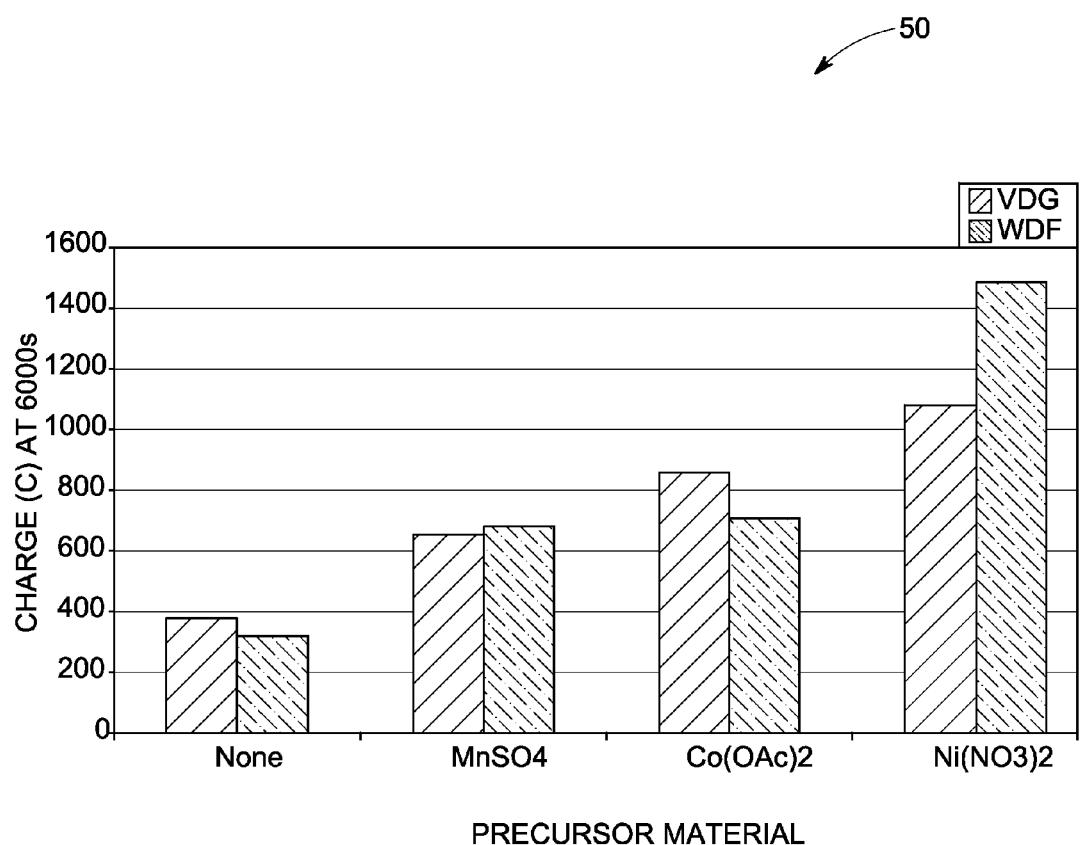

These and other features, aspects, and advantages of the embodiments of present invention will become better understood when the following detailed description is read with reference to the accompanying drawings in which like characters represent like parts throughout the drawings, wherein:

FIG. 1 is a flow diagram of a method according to one embodiment of present invention; and FIG. 2 is a chart showing improvement in catalytic activity over base case and effect of precursor materials on the catalytic activity of anode.

DETAILED DESCRIPTION

As discussed in detail below, certain embodiments of the present invention discuss a method of making anodes for alkaline water electrolysis that have good catalytic activity and that allow for a cost effective method of preparation of the electrodes. Although the discussion is centered on catalytic anodes for alkaline water electrolysis, the electrode prepared by embodiments of this invention is not limited to this application alone. The electrodes made according to the embodiments of the present invention can be used for example as an oxygen or air electrode in an alkaline fuel cell or any other application that involves oxygen evolution or consumption at the electrode in an alkaline environment.

As discussed in previous sections, the overvoltage at the anode constitutes a significant part of the total cell overvoltage. The embodiments of the current invention overcome these deficiencies by using the methods described below.

Carbon and graphite have been used as stable electrode materials in many harsh environments. However, these materials are not used as anodes in alkaline water electrolysis due to high oxygen evolution overpotential and, to a lesser extent, due to reaction with and consumption by oxygen that evolves during the course of the reaction. Such results have been observed in electrolysis of brine solutions. As per embodiments of the current invention, this is overcome by coating the surface and the pores of carbon electrode with a precursor material.

The anodes prepared by embodiments of the current invention thus involve a carbonaceous substrate coated with an electrocatalytic precursor material. The precursor material is applied to the substrate by the methods discussed herein, and, as discussed in detail below, is found to be very effective.

Various steps in the process are represented in FIG. 1. The method of preparation of the catalytic anode is generally shown as 30. In step 32, a carbonaceous material is provided as a substrate for the electrode. In step 34, a layer of precursor material is formed on the carbonaceous material, typically by adsorption onto the carbonaceous material. As shown in step 36, the precursor material is subsequently converted to its hydroxide forms by treatment with an alkali solution. In step 38, the hydroxides of the precursor material are converted to oxy-hydroxide form. In operation, both hydroxide and oxy-hydroxide forms provide catalytic activity to reduce overpotential.

The carbonaceous material in step 32, includes, for example, materials like carbon and graphite among others. These are available in many physical forms like sheet, felt, cloth, mesh, foam etc. Generally a material with a high surface area is chosen as a substrate of the electrode, resulting in higher interfacial area between the anode and the electrolyte thus increasing the rate of electrolysis.

In step 34, a layer of precursor material is formed on the carbonaceous substrate. The precursor material is typically a salt of transition metals. In some embodiments transition metals include nickel, cobalt or manganese. The anion in the salt could be any group including but not limited to nitrates, sulfates, acetates, or chlorides of these metals. In some embodiments, the precursor material may be a solution of nickel nitrate, manganese sulfate or cobalt acetate. A solution as mentioned herein refers to a solution with a concentration of the salt ranging from about 0.1% to about 50% by weight. In one embodiment, the method of forming a layer on the carbonaceous substrate includes dipping the substrate in the solution of the precursor material and allowing the precursor material to be adsorbed on the carbon surface. The forming of the layer of the precursor material on the carbonaceous substrates may also be done by electrochemical techniques wherein the carbonaceous materials are used as electrode in the solution of the precursor material and an electric current is applied. In the presence of the electric current, the electrode surface gets plated by the precursor material. When the process is carried out for a sufficient amount of time (of the order of several minutes depending on voltage and current levels), the precursor material gets plated into the pores of the substrate. It is important to allow for this plating of the precursor material into the pores of the substrate material, since this step creates higher electrode surface area for electrode. This method does not need any sophisticated set up or elaborate procedures thus cutting down the costs involved to a large extent.

In step 36, the electrode, including the precursor material adsorbed on the carbonaceous substrate, is treated with an alkali solution to convert the precursor material to its hydroxide forms. In one embodiment, the alkali used to convert the precursor material to its hydroxide forms is potassium hydroxide (KOH). Typically 30% KOH solution is used as electrolyte for the alkaline water electrolysis. Thus there is no need of any extra chemicals required during the process. This leads to significant savings in the overall cost. The hydroxide forms of the precursor material show a catalytic activity and the electrode can then be used as a catalytic anode.

Step 38 involves conversion of hydroxide form of precursor material to its oxyhydroxide form. Oxyhydroxy form is a more stable electrocatalyst for reduction of the anodic overpotential. This can be achieved in two ways. In one embodiment, this is done in-situ when the electrode is used as an anode during an alkaline electrolysis process.

In another embodiment, step 38 could be performed before the electrode is deployed in the alkaline electrolyzer. In this case an arrangement similar to an alkaline electrolyzer is made and the electrode is used as anode in electrolytic solution, for example a KOH solution. The process is continued till at least a part of the hydroxide is converted to oxyhydroxide form, and then the electrode is deployed in the actual alkaline electrolysis cell where it retains its catalytic activity for a long time.

In another embodiment, both conversion to hydroxide form and subsequent conversion to oxyhydroxide form is done in situ, that is within the electrolysis cell. The anode coated with precursor material is placed in the electrolysis cell and the cell is filled with the electrolyte solution. The precursor material is converted to hydroxide form. An electric potential is then applied to convert the hydroxide to oxyhydroxide form.

Thus the process outlined in the embodiments of current invention is very simple to perform. First, it involves carbonaceous substrates that have substantial cost advantages. The method also overcomes problems associated with carbon-based electrodes used in oxygen environment. Second, the method of making anodes described herein does not need any extra chemicals or special equipments. The process is very simple and does not involve any elaborate preparation steps. At the same time it provides formation of stable hydroxide and oxyhydroxide forms on the anode surface that provide electrocatalytic activity reducing the electrode overpotential. Thus it fulfils the objective of providing for a simple and cost effective process for making of anodes for alkaline water electrolysis.

EXAMPLES

The following examples are presented to further illustrate certain embodiments of the present invention. These examples should not be read to limit the invention in any way.

Two types of carbonaceous materials (carbon felt of grade VDG and graphite felt of grade WDF supplied by National Specialty Products) were used to prepare catalytic anodes for alkaline electrolysis. 0.5 cm×1 cm×2 cm pieces were cut from each of these materials and used for preparing anodes for alkaline water electrolysis. Experiments were conducted with and without the coating of precursor material as outlined in the embodiments of invention to demonstrate the catalytic activity provided by the coating of precursor material. Batch experiments were conducted in a standard 4-dram glass vials equipped with a Teflon cap. Two holes were drilled in the cap for the electrodes and one for sampling and gas release. Power potentiostats (CHI 1100) were used for bulk electrolysis runs with coulometry. The overpotential of electrodes is typically described by Tafel equation.

$$\eta = a + b * \log i \quad (1)$$

where 'η' represents overpotential, 'i' represents current density and 'a' and 'b' are characteristic constants of the electrode system; 'a' provides information about the rate constant and the exchange current density of the reaction and 'b' is the "Tafel slope" that provides information about the mechanism of the reaction.

Parameters of the Tafel equation (1) were determined from the measured cell voltage and current at several points to obtain a good fit (Rsq>95%). The accumulated charge at 2.5 V was measured after 6000 seconds of alkaline electrolysis. Subsequently the anodes were rinsed with deionized water, soaked in 5 wt. % solution of precursor material. Multiple precursor materials including manganese sulfate ($MnSO_4$), Cobalt acetate ($Co(OAc)_2$), and nickel nitrate ($Ni(NO_3)_2$) were used. The precursor materials were adsorbed onto the surface and pores of the substrate during the soaking process. This was followed by treatment of the electrodes with 30% KOH solution where the precursor material was converted to respective hydroxide forms.

Table (1) lists various experimental results obtained during testing performance of the electrode with each of the precursor materials. The table reports the parameters 'a' and 'b' of Tafel equation, and current and charge values after 6000 seconds for each pair of substrate and precursor. The table also shows improvement observed in the activity of anode with and without coating of precursor material subsequently converted to hydroxide and oxyhydroxide forms in column 'Charge improvement'. The charge improvement column is indicative of the catalytic activity of the precursor material.

TABLE 1

Experimental results—effect of precursor materials

| Substrate | Precursor | Parameters of Tafel equation $\eta = a + b * \log i$ | | Current @ 6000 s, mA | Charge @ 6000 s, C | Charge improvement, % |
| --- | --- | --- | --- | --- | --- | --- |
| | | a | b | | | |
| VDG | None | 0.36 | 3.01 | 59 | 378 | — |
| VDG | $MnSO_4$ | 0.36 | 2.97 | 104 | 652 | 75 |
| VDG | $Co(OAc)_2$ | 0.28 | 2.64 | 133 | 857 | 127 |
| VDG | $Ni(NO_3)_2$ | 0.32 | 2.75 | 173 | 1080 | 186 |
| WDF | None | 0.35 | 2.98 | 53 | 321 | — |
| WDF | $MnSO_4$ | 0.31 | 2.81 | 103 | 681 | 72 |
| WDF | $Co(OAc)_2$ | 0.28 | 2.66 | 113 | 705 | 125 |
| WDF | $Ni(NO_3)_2$ | 0.32 | 2.75 | 245 | 1483 | 292 |

FIG. 2 is a chart illustrating effects of various precursors on the performance of the electrode, generally shown as 50. The x-axis represents the precursor material used and y-axis represents values of charge after 6000 seconds. The base case, which does not involve use of any precursor material is shown as 'None'. The different series shown by separate hatching lines show results for different substrate materials, namely the grades VDG and WDF respectively.

A comparison of charge values (height of bar at that precursor name), with those at 'None' (height of bar at 'None'), for appropriate substrate, indicates the improvement offered by that precursor. It is observed that for a given substrate material, the catalytic activity of Cobalt based precursor is higher than that of Manganese based precursor. It is also observed that the catalytic activity of Nickel based precursor is higher than catalytic activity of cobalt based precursor.

The effect of choice of precursor material is also seen from FIG. 2. As described earlier, VDG is a carbon felt material and WDF is a graphite felt. The effect of substrate material is observed by comparing the height of bars at a given precursor material. Generally (with exception of Cobalt precursor) it is observed that the WDF material shows higher activity than VDG. One reason for the higher activity is the higher specific surface area and processing steps in making these materials.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of making an anode for an alkaline electrolysis cell comprising:
   forming a layer of a precursor material on a carbonaceous material;
   converting the precursor material to a hydroxide form;
   wherein, said precursor material is a solution of manganese or cobalt salt; and
   said carbonaceous material has a form selected from the group consisting of sheet, felt, cloth, mesh, foam, and combinations thereof.

2. The method of claim 1, wherein the carbonaceous material comprises a high surface area carbon material.

3. The method of claim 1, wherein the carbonaceous material comprises graphite.

4. The method of claim 1, wherein the precursor material is a manganese or cobalt metal salt with an anion selected from the group consisting of nitrate, acetate, sulfate, chloride and combinations thereof.

5. The method of claim 1, wherein the precursor material is selected from the group consisting of cobalt acetate, manganese sulfate and combinations thereof.

6. The method of claim 1, wherein the forming of the layer comprises adsorption of the precursor material on the surface of the carbonaceous material.

7. The method of claim 1, wherein the converting the precursor material to a hydroxide form is accomplished by treatment with an alkaline electrolyte.

8. The method of claim 7, wherein the hydroxide solution comprises potassium hydroxide.

9. A method of making an anode for alkaline electrolysis cell comprising:
   adsorbing a manganese or cobalt precursor material on a carbonaceous material;
   converting the manganese or cobalt precursor material to hydroxide form;
   converting in-situ the manganese or cobalt precursor material from hydroxide form to oxy-hydroxide form within the alkaline electrolysis cell;
   wherein said carbonaceous material has a form selected from the group consisting of sheet, felt, cloth, mesh, foam, and combinations thereof.

10. The method of claim 9, wherein the carbonaceous material comprises carbon felt.

11. The method of claim 9, wherein the carbonaceous material comprises graphite felt.

12. A catalytic anode for an alkaline electrolysis cell prepared by:
   forming a layer of a precursor material on a carbonaceous material; and
   converting the precursor material to a hydroxide form;
   wherein said carbonaceous material has a form selected from the group consisting of sheet, felt, cloth, mesh, foam, and combinations thereof; and
   wherein the precursor material is selected from the group consisting of cobalt acetate, manganese sulfate and combinations thereof.

13. The anodes of claim 12, wherein the carbonaceous material comprises graphite.

* * * * *